2 Sheets--Sheet 1.

S. H. LITTLE.

Street-Cars.

No. 5,792.

Reissued March 17, 1874.

WITNESSES:

Robert Burns.
Walter Allen

INVENTOR:

Samuel H. Little
By Knight Bros. Attorneys.

AM. PHOTO-LITHOGRAPHIC Co. N. Y. (OSBORNE'S PROCESS.)

2 Sheets--Sheet 2.

S. H. LITTLE.

Street-Cars.

No. 5,792. Reissued March 17, 1874.

WITNESSES:

Robert Burns.

Walter Allen

INVENTOR:

Samuel H. Little.

By Knight Bros. Attorneys.

AM. PHOTO-LITHOGRAPHIC CO. N. Y. (OSBORNE'S PROCESS)

UNITED STATES PATENT OFFICE.

SAMUEL H. LITTLE, OF ROSEMOND, ILLINOIS.

IMPROVEMENT IN STREET-CARS.

Specification forming part of Letters Patent No. 140,052, dated June 17, 1873; reissue No. 5,792, dated March 17, 1874; application filed December 23, 1873.

DIVISION B.

*To all whom it may concern:*

Be it known that I, SAMUEL H. LITTLE, of Rosemond, Christian county, Illinois, have invented a certain Improvement in Street-Railway Cars, of which the following is a specification:

This improvement relates to the manner of arranging and applying the doors of street-cars; and consists in placing the doors outside the walls of the cars, instead of making the end walls double, so as to admit of the door sliding into the wall, as heretofore.

Figure 1:
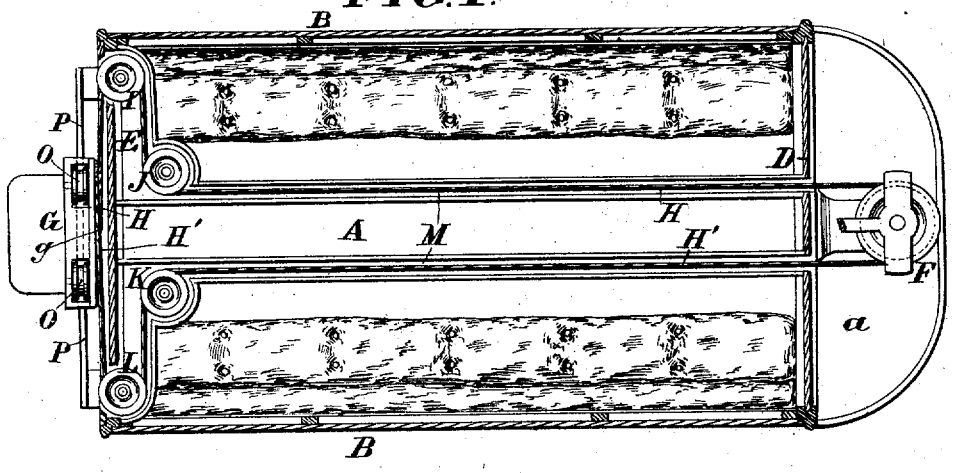
Figure 2:
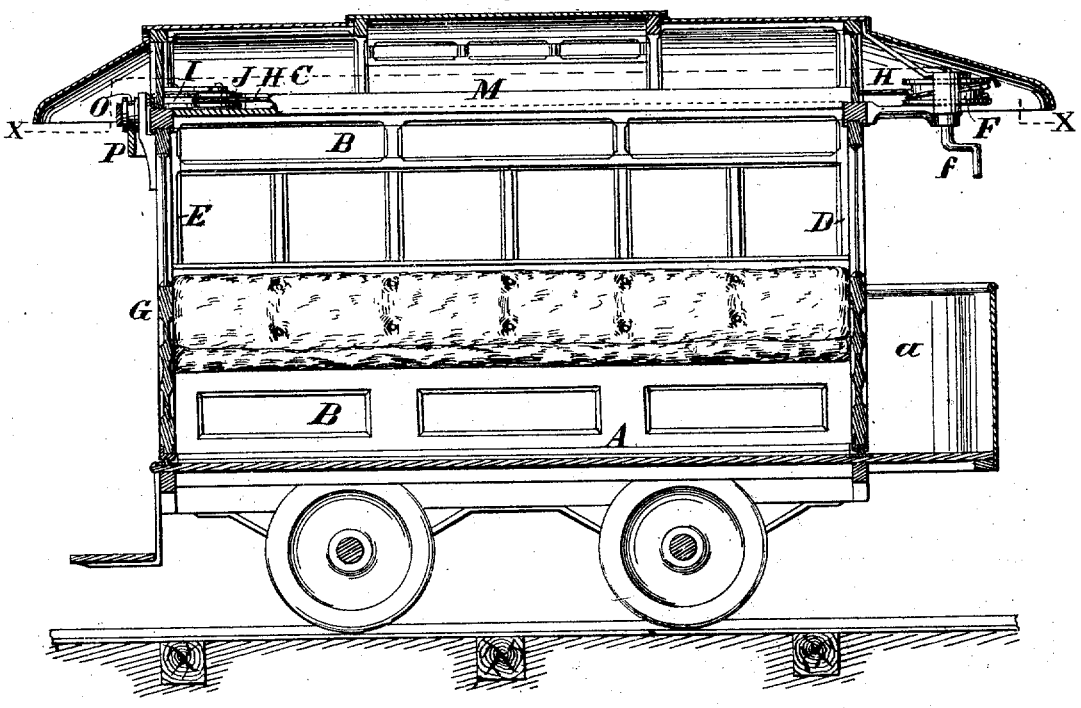
Figure 5:
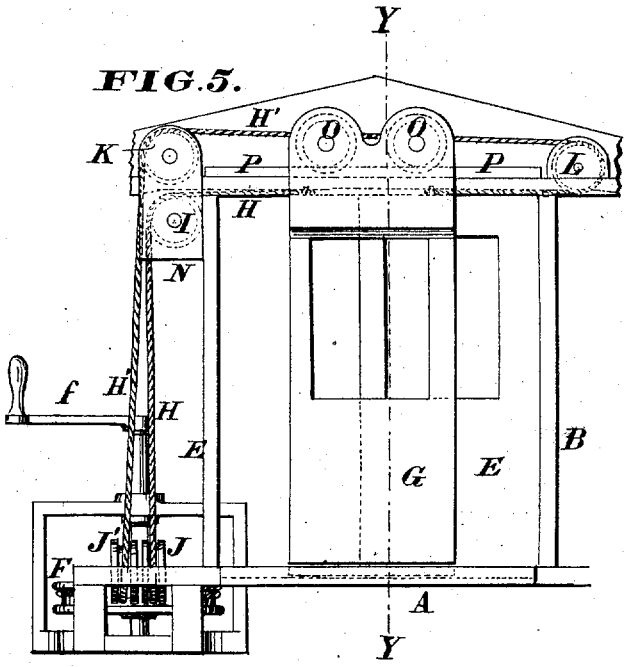
Figure 6:
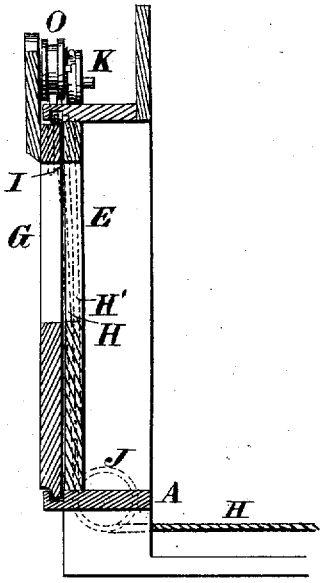
Figure 3:
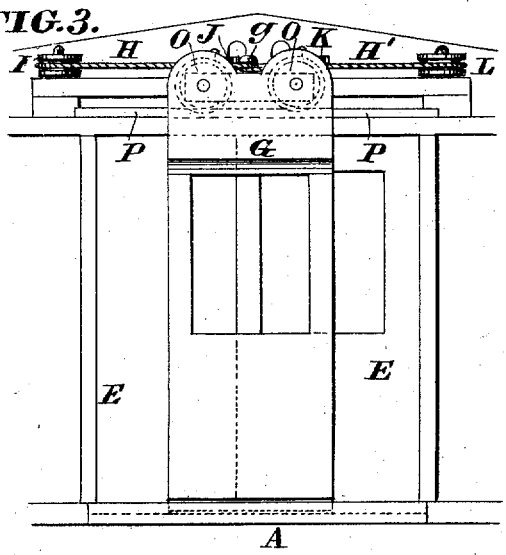
Figure 4:
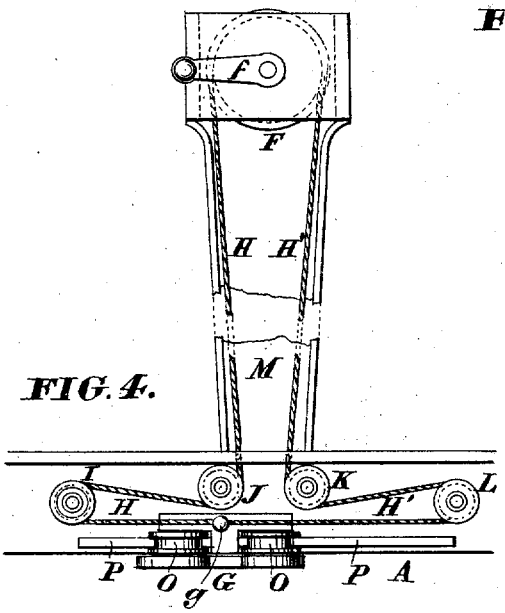

In the drawings, Figure 1 is a horizontal section of the car at the line *x x* in Fig. 2, looking downward. Fig. 2 is a longitudinal section of the car taken at the middle. Fig. 3 is a rear elevation of the rear door. Fig. 4 is a top view, illustrating the arrangement of the door and operating-cord. Fig. 5 is a rear view of the rear door, showing a different arrangement for the operating-cord. Fig. 6 is a vertical section at the line *y y* in Fig. 5.

A is the floor of the car; B, the side; and C the roof. D is the front-end wall, and E the rear-end wall. At the front platform *a*, either above, as shown in Fig. 1, or at one side beneath, as shown in Fig. 5, is a pulley or drum, F, around which is coiled the cord by which the rear door is operated. The ends of this cord are attached to the door substantially as shown at *g*.

In Figs. 1, 2, 3, and 4, one end, H, of the cord is attached to the door G and passes, as shown, around the pulleys I and J to the hand-pulley F, around which it is coiled sufficiently to be turned with this pulley operated by the hand-crank *f*. From the pulley F the cord extends to the pulley K, and from that to the pulley L and to the door G, this end H′ being also attached to the door, so that by the turning of the hand-crank *f* the door may be moved in either direction. The cord H H′ passes through channels, trunks, or pipes M to hide and support it and to protect it from obstruction.

In Fig. 5 the hand pulley or drum F is shown just beneath the level of the floor at one side of the driver's platform. In this case the end of the cord H passes from the door over the pulley I and down through a vertical case or trunk, N, then beneath the pulley J and forward to the hand-pulley F, from which the cord passes backward and beneath the pulley J′, then over the pulley K and around the pulley L to the door G. The door is supported by rollers O, which are secured to its top and run on a track, P, on the outside of the car. The lower end of the door may be guided in any suitable manner. The doors G are placed outside the end walls D and E, so as to slide back and forth in a plane outside that of the wall.

This construction has several advantages over the common arrangement of end walls and doors, where the walls are made double leaving a deep recess extending to the corner of the car to receive the door.

This construction was advantageous in the old form of sliding-door street-cars, which were drawn by two horses, and had a platform at each end for the use of passengers, who would have obstructed the movement of the door.

When one-horse cars were first introduced, these double-team cars were shortened up to reduce them to a proper size, the arrangement of the doors being unaltered, and the double walls being retained, although the passenger-platforms were removed.

Besides the needless expense involved in the construction of the double end walls, they have the disadvantage of checking the passage of air in the summer time, as it is inadmissible to make the two shells (constituting the end wall) of sufficient thickness to contain a falling sash, and consequently the windows have to remain closed when the car is occupied by passengers.

I am aware that external sliding doors have before been applied to the sides of freight-cars; this, therefore, I do not claim.

What I do claim, and desire to secure by Letters Patent, is—

The sliding door G of a street-railway car, hung on the outside of the rear wall and supported at top by rollers O traveling on a track, P, on the outside of the rear wall and beneath the bonnet or hood, substantially as set forth.

SAMUEL H. LITTLE.

Witnesses:

SAML. KNIGHT,

ROBERT BURNS.